United States Patent
Nagy et al.

(10) Patent No.: US 6,462,153 B1
(45) Date of Patent: Oct. 8, 2002

(54) METHOD OF POLYMERIZING VINYL CHLORIDE MONOMER

(75) Inventors: Sandor Nagy, Grand Island; John Tyrell, Williamsville, both of NY (US)

(73) Assignee: Occidental Chemical Corporation, Dallas, TX (US)

( * ) Notice: Subject to any disclaimer, the term of this patent is extended or adjusted under 35 U.S.C. 154(b) by 0 days.

(21) Appl. No.: 08/627,202

(22) Filed: Apr. 3, 1996

(51) Int. Cl.⁷ .................................................. C08F 4/44
(52) U.S. Cl. ..................... 526/129; 526/163; 526/169.2
(58) Field of Search ................................ 526/169.2, 129

(56) References Cited

U.S. PATENT DOCUMENTS

| | | | | |
|---|---|---|---|---|
| 3,062,797 A | * | 11/1962 | Stanek | ..................... 526/169.2 |
| 3,285,898 A | * | 11/1966 | MacKenzie et al. | ......... 526/129 |
| 3,775,391 A | | 11/1973 | Jennings et al. | |
| 3,786,032 A | | 1/1974 | Jennings et al. | |
| 4,129,702 A | | 12/1978 | Roberts et al. | |

FOREIGN PATENT DOCUMENTS

| | | | | |
|---|---|---|---|---|
| GB | 799823 | * | 8/1958 | ................ 526/163 |
| GB | 834937 | * | 5/1960 | .............. 526/169.2 |
| GB | 856913 | * | 12/1960 | .............. 526/169.2 |
| GB | 944741 | * | 12/1963 | .............. 526/169.2 |
| GB | 1478456 | | 6/1977 | |
| GB | 1478457 | | 6/1977 | |
| JP | 55-133412 | * | 10/1980 | .............. 526/169.2 |

* cited by examiner

Primary Examiner—Bernard Lipman
(74) Attorney, Agent, or Firm—Richard D. Fuerle

(57) ABSTRACT

Disclosed is a catalyst composition and a method of polymerizing vinyl chloride using it. The catalyst composition is a mixture of a vanadyl (V) catalyst having the formula

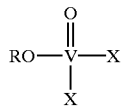

and about 0.5 to about 15 moles of an alkyl aluminum cocatalyst having the formula $(R')_m Al(X')_{3-m}$ per mole of said catalyst, where R is a group containing 1 to 14 carbon atoms, each X is independently selected from halogen or OR, each R' is independently selected from alkyl from $C_1$ to $C_{10}$, each X' is independently selected from halogen,

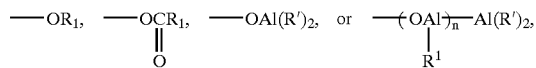

$R_1$ is alkyl from $C_1$ to $C_{10}$, haloalkyl from $C_1$ to $C_{10}$, alkoxyalkyl where each alkyl group is independently selected from $C_1$ to $C_{10}$, or aryl from $C_6$ to $C_{14}$, m is 1 or 2, and n is 1 to 100. Also disclosed is a method of polymerizing vinyl chloride comonomer using this catalyst.

20 Claims, No Drawings

METHOD OF POLYMERIZING VINYL CHLORIDE MONOMER

BACKGROUND OF THE INVENTION

This invention relates to a novel catalyst composition and to the polymerization of vinyl chloride using that composition. In particular, it relates to a catalyst composition that is a mixture of a vanadyl (V) catalyst and an alkyl aluminum cocatalyst.

Vinyl chloride monomer (VCM) is commercially polymerized to produce polyvinyl chloride (PVC) using peroxide initiators. Because peroxides are unstable and can even be explosive, they must be handled and stored very carefully at a low temperature, which complicates and adds to the cost of the manufacturing process. Moreover, elevated temperatures are usually required in polymerization reactions initiated by peroxides (50–80° C.), which could deteriorate the properties of the product. Besides, the free-radical nature of the traditional polymerization process implies that the product properties, like tacticity, molecular weight, and polydispersity, are not influenced in any way by the structure or composition of the radical initiator. Efforts have been made to find non-peroxide catalysts for polymerizing vinyl chloride. For example, U.S. Pat. Nos. 3,775,391, 3,786,032, and 4,129,702 disclose the polymerization of vinyl or vinylidene halides using as an initiator a transition metal compound, such as vanadium oxytrichloride, and an organoaluminum or organozinc compound, such as triethyl aluminum, including a ligand derived from an oxime or a hydroxy ester. These catalysts seem to be highly specific and, like most catalysts, small chemical variations thereof are nonfunctional.

SUMMARY OF THE INVENTION

We have discovered a novel organometallic catalyst composition that is useful for polymerizing vinyl chloride monomer alone or with comonomers. The catalyst composition of this invention is a mixture of a vanadyl (V) catalyst and an alkyl aluminum cocatalyst. Unlike peroxide initiators, which require elevated temperatures, the organometallic catalyst composition of this invention can be used not only at high temperatures, but also at ambient or below ambient temperatures. Besides, in the polymerization process using the new catalyst composition, the molecular weight of the PVC can be easily controlled through the catalyst concentration. Also, the catalyst composition is not explosive and the components can be stored at room temperature. The catalyst compositions of this invention can be used in solution, bulk, or vapor phase polymerization of vinyl chloride, the last two processes being the most attractive for economical reasons.

DESCRIPTION OF THE PREFERRED EMBODIMENTS

The catalyst composition of this invention is a mixture of a vanadyl (V) catalyst and an alkyl aluminum cocatalyst.

The vanadyl (V) catalyst has the general formula

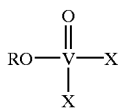

where R is a group containing 1 to 14 carbon atoms and X is halogen or OR. Preferably, R is alkyl from $C_1$ to $C_4$ and X is OR because those catalysts are more readily available. Some of the catalysts where R is alkyl, such as vanadyl (V) triisopropoxide, are commercially available. Catalysts that can not be purchased can be easily made by reacting vanadium trihalide oxide with 1, 2, or 3 moles of an alcohol, a phenol, a carboxylic acid, an enolizable ketone, or their salts, a reaction that proceeds readily at room temperature. A vanadyl (V) catalyst can also be prepared by reacting vanadium trihalide oxide with a compound containing an oxirane ring. For example, one mole of vanadium trichloride oxide can be reacted with 1, 2, or 3 moles of ethylene oxide:

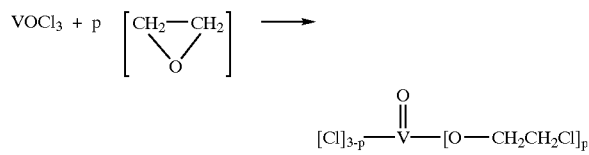

where p is 1, 2, or 3. This reaction proceeds readily at room temperature in 1 to 24 hours. Examples of suitable compounds having an oxirane ring include ethylene oxide, propylene oxide, epichlorohydrin, cyclohexene oxide, and cyclooctene oxide. The preferred vanadyl (V) catalyst is the reaction product of vanadium trichloride oxide and cyclohexene oxide because it is readily available and works well.

The alkyl aluminum cocatalyst has the general formula

$$(R')_m Al(X')_{3-m}$$

where each R' is independently selected from alkyl from $C_1$ to $C_{10}$, X' is halogen, $-OR_1$, $-OC(=O)R_1$, $-OAl(R')_2$ or $(OAlR')_n$, $-OAl(R')_2$, $R_1$ is alkyl from $C_1$ to $C_{10}$, haloalkyl from $C_1$ to $C_{10}$, alkoxyalkyl where each alkyl group is independently selected from $C_1$ to $C_{10}$, or aryl from $C_6$ to $C_{14}$, m is 1 or 2, and n is 1 to 100. Preferably, R' is alkyl from $C_1$ to $C_4$, X' is halogen, preferably chlorine, $R_1$ is alkyl from $C_1$ to $C_4$, most preferably ethyl, m is 2, and n is 1 to 10, because those compounds are commercially available. Examples of alkyl aluminum compounds that can be used as cocatalysts include diethyl aluminum ethoxide, diethylaluminum chloride, ethylaluminum dichloride, dimethylaluminum chloride, diethylaluminum propionate, and diethylaluminum benzoate. The preferred alkyl aluminum cocatalyst is diethyl aluminum ethoxide because it is readily available and gives good results. Many of the alkyl aluminum compounds included within the scope of the above formula are commercially available. Alkylaluminum cocatalysts where X' is $OR_1$ can be easily prepared by reacting a trialkylaluminum compound with an alcohol or a phenol. Similarly, compounds where X' is $OC(=O)R_1$ can be easily made by reacting a trialkylaluminum compound with an aliphatic or aromatic carboxylic acid:

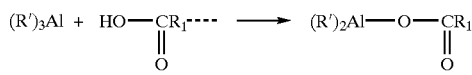

Compounds where X' is $-OAl(R')_2$ can be prepared by reacting two moles of trialkyl aluminum with one mole of water. For example, if two moles of triethyl aluminum are reacted with one mole of water the following alkyl aluminum compound is believed to be produced, where "Et" is ethyl:

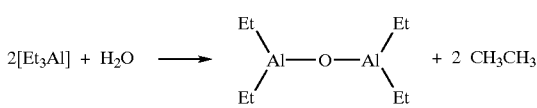

Similarly, compounds where the X' group is —(OAlR')$_n$OAl(R')$_2$ can be made by reacting one mole of trialkyl aluminum with one mole of water. For example, if one mole of trialkyl aluminum is reacted with one mole of water, the following reaction occurs:

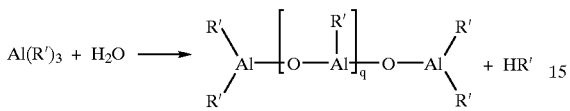

where q can be 1 to 100.

The molar ratio of the alkyl aluminum cocatalyst to the vanadyl (V) catalyst in the catalyst composition can vary from about 0.5 to about 15, but is preferably about 1.5 to about 4 as the optimum seems to be at about 2. If less of the alkyl aluminum cocatalyst is used the polymerization is less efficient and more of the alkyl aluminum cocatalyst results in no significant improvement.

The catalyst composition can be prepared by simply mixing together the alkyl aluminum cocatalyst and the vanadyl (V) catalyst in the desired proportion. This can be accomplished before the catalyst composition contacts the monomer or the catalyst and cocatalyst can be added separately to the monomer. For convenience in laboratory experiments, it is sometimes desirable to use a solvent such as hexane, toluene, or tetrahydrofuran (THF). Preferably, if a solvent is desired vinyl chloride monomer itself is used as the solvent so that problems of disposing of a solvent are avoided.

The catalyst composition is preferably supported, particularly if it is used for bulk or vapor phase polymerization. The support can be an insoluble particulate such as alumina, silica, clay, various other inorganic oxides, or polyvinyl chloride; fumed silica or other small particle size silica is preferred. The finely divided support can be mixed with a solution of the catalyst and the solvent removed by filtration, decanting, or evaporation, which deposits the catalyst on the support. The support holds the catalyst composition and prevents it from entering the solution phase. The support also controls the morphology of the polymer so that the polymer is produced as small particles, rather than in large clumps.

The catalyst composition is generally used in an amount of about 0.01 to about 50 mmole vanadium per mole of monomer; less is usually ineffective and more is unnecessary and may be deleterious to the stability of the PVC. Polymerization can occur within a temperature range of $-40$ to $80°$ C. and within a pressure range of 0 to 200 psig (0 to 1500/KPa). Most of the unsupported catalyst compositions within the scope of this invention are soluble in the monomers.

The catalyst composition of this invention can be used to polymerize vinyl chloride or copolymerize it with other ethylenically unsaturated monomers such as olefins, halogenated olefins, vinyl ethers, or vinyl esters, as well as acrylic esters, nitrites, and amides. The comonomers can be used in amounts not exceeding 50 mol %, most often 35 mol %, of the mixture of comonomers used in the copolymerization. The process according to the invention is very particularly suitable for the homopolymerization of vinyl chloride. The preferred comonomers are vinyl acetate, vinylidene chloride, and methylenenorbornene because they work well and are commercially important.

The vinyl chloride monomer can be polymerized as a slurry, in a solvent, as a pure liquid or liquified gas, or as a vapor, and the polymerization process can be batch or continuous. As the polymer forms, it precipitates and is collected and purified if necessary. It is then compounded with plasticizers and other additives and is processed into various shapes according to methods well known in the art.

The following examples further illustrate this invention.

EXAMPLE 1

To 1 ml of a solution of 1.82 gms of vanadium triisopropoxide oxide and 8.2 ml hexane (0.75 millimole V) in a test-tube protected with a rubber septum was added 10 ml hexane. To this stirred solution was added 1 ml of a solution of 1.95 gms diethylaluminum ethoxide and 7.7 ml hexane (1.5 millimole Al). Using a syringe needle submersed below the liquid level, a gaseous stream of vinyl chloride monomer was added to this solution until the solution had become saturated. The weight uptake of the solution was 0.77 gms VCM. The mixture was kept at room temperature and was stirred on a magnetic stirrer for 15 hours at ambient temperature. After the excess VCM had been purged with nitrogen, the reaction mixture was quenched by pouring it onto a solution of 5 ml concentrated HCl(aq) and 100 cc methanol. The product was filtered, washed several times with methanol, and was air dried 24 hours to obtain 0.50 gms polyvinyl chloride (PVC) as a white powder.

EXAMPLES 1 to 3 AND COMPARATIVE EXAMPLES 4 to 24

In similar fashion to Example 1, several combinations were used to show the novelty of the invention. They are listed in Table 1. All polymerizations were done with 0.75 millimoles of catalyst and 1.5 millimoles of cocatalyst. Examples 1 to 3 illustrate this invention and show that the catalysts are efficient for the production of PVC. Comparative Examples 4 to 6 show that trialkylaluminum cocatalysts outside the scope of this invention are ineffective for the polymerization of PVC. Comparative Examples 7 to 12 show that vanadium oxytrichloride, which is outside the scope of this invention, is ineffective for the polymerization of VCM. Comparative Examples 13 to 18 show that titanium alkoxides, which are outside of the scope of this invention, are ineffective for the polymerization of VCM. Comparative Examples 19 to 24 show that titanium tetrachloride, which is outside of the scope of this invention, is ineffective for the polymerization of VCM. That the particular catalyst of this invention is effective for the polymerization of VCM when other closely related organometallic catalysts are ineffective is surprising and was not anticipated. In Table 1 "trace" means less than 0.05 gms PVC and was not isolated, "iPr" is isopropyl, and "Bu" is butyl.

TABLE 1

| Example | Catalyst | Cocatalyst | VCM (g) | PVC (g) |
|---|---|---|---|---|
| 1 | VO(O-iPr)$_3$ | diethylaluminum ethoxide | 0.77 | 0.5 |
| 2 | VO(O-iPr)$_3$ | diethylaluminum chloride | 0.8 | 0.59 |
| 3 | VO(O-iPr)$_3$ | ethylaluminumdichloride | 0.75 | 0.13 |
| 4* | VO(O-iPr)$_3$ | triisobutyl aluminum | 0.78 | 0.07 |
| 5* | VO(O-iPr)$_3$ | trimethylaluminum | 0.8 | 0 |
| 6* | VO(O-iPr)$_3$ | triethylaluminum | 0.78 | trace |

TABLE 1-continued

| Example | Catalyst | Cocatalyst | VCM (g) | PVC (g) |
|---|---|---|---|---|
| 7* | VOCl$_3$ | diethylaluminumethoxide | 0.82 | trace |
| 8* | VOCl$_3$ | diethylaluminum chloride | 0.8 | trace |
| 9* | VOCl$_3$ | ethylaluminumdichloride | 0.98 | 0 |
| 10* | VOCl$_3$ | triisobutyl aluminum | 0.81 | 0 |
| 11* | VOCl$_3$ | trimethylaluminum | 0.78 | 0 |
| 12* | VOCl$_3$ | triethylaluminum | 0.69 | trace |
| 13* | Ti(OBu)$_4$ | diethylaluminumethoxide | 0.86 | trace |
| 14* | Ti(OBu)$_4$ | diethylaluminum chloride | 0.82 | 0.03 |
| 15* | Ti(OBu)$_4$ | ethylaluminumdichloride | 0.77 | 0.06 |
| 16* | Ti(OBu)$_4$ | triisobutyl aluminum | 0.74 | 0 |
| 17* | Ti(OBu)$_4$ | trimethylaluminum | 0.85 | trace |
| 18* | Ti(OBu)$_4$ | triethylaluminum | 0.77 | 0 |
| 19* | TiCl$_4$ | diethylaluminumethoxide | 0.9 | trace |
| 20* | TiCl$_4$ | diethylaluminum chloride | 0.77 | 0 |
| 21* | TiCl$_4$ | ethylaluminumdichloride | 0.81 | trace |
| 22* | TiCl$_4$ | triisobutyl aluminum | 0.74 | 0 |
| 23* | TiCl$_4$ | trimethylaluminum | 0.68 | 0 |
| 24* | TiCl$_4$ | triethylaluminum | 0.81 | 0 |

*Comparative Example

EXAMPLES 25 TO 57

To further illustrate our invention, several other combinations were used in a similar fashion, with the exception that the polymerizations were stopped after three hours. Variations in the cocatalyst were tested and the results are given in Table 2. For Examples 25 to 57, the solvent was hexane, 0.75 millimole vanadium triisopropoxide oxide was used as the catalyst, and 1.5 millimoles of cocatalyst was used. For Examples 27 to 57, the cocatalyst was prepared from 1.5 millimoles triethylaluminum with (except as noted) 1.5 millimoles reactant. The reactant was stirred with the triethylaluminum for 1 hour in hexane to yield the new aluminum cocatalyst and ethane. Vanadium triisopropoxide oxide was added, followed by VCM.

TABLE 2

| Example | Cocatalyst | VCM (g) | PVC (g) |
|---|---|---|---|
| 25 | Et$_2$AlOEt | 2.27 | 0.54 |
| 26 | Et$_2$AlOEt | 2.49 | 0.68 |
| 27* | Et$_2$AlON=C(Me)$_2$ | 1.33 | 0.19 |
| 28 | Et$_3$Al + 0.75 mmole H$_2$O | 1.28 | 0.243 |
| 29 | Et$_3$Al + H$_2$O | 1.27 | 0.19 |
| 30 | Et$_3$Al + phenol | 1.5 | 0.45 |
| 31 | Et$_3$Al + triphenysilanol | 1.64 | 0.28 |
| 32 | Et$_3$Al + ethanol | 1.45 | 0.38 |
| 33 | Et$_3$Al + benzoic acid | 1.59 | 0.594 |
| 34 | Et$_3$Al + tetrahydrofurfuryl alcohol | 1.56 | 0.342 |
| 35 | Et$_3$Al + 2hydroxyacetophenone | 1.44 | 0.26 |
| 36* | Et$_3$Al + diisopropylamine | 1.34 | 0 |
| 37 | Et$_3$Al + acetylacetone | 1.52 | 0.561 |
| 38 | Et$_3$Al + 1 mmole benzoic acid | 1.6 | 0.58 |
| 39 | Et$_3$Al + 2 millimole benzoic acid | 1.45 | 0.44 |
| 40 | Et$_3$Al + 3 millimole benzoic acid | 1.48 | 0.38 |
| 41 | Et$_3$Al + 2-chloro-benzoic acid | 1.64 | 0.68 |
| 42 | Et$_3$Al + 3-chloro-benzoic acid | 1.55 | 0.42 |
| 43 | Et$_3$Al + anisic acid | 1.36 | 0.31 |
| 44 | Et$_3$Al + m-anisic acid | 1.38 | 0.31 |
| 45 | Et$_3$Al + p-anisic acid | 1.37 | 0.4 |
| 46 | Et$_3$Al + benzoylbenzoic acid | 1.3 | 0.34 |
| 47 | Et$_3$Al + m-benzoylbenzoic acid | 1.67 | 0.38 |
| 48 | Et$_3$Al + p-benzoylbenzoic acid | 1.38 | 0.31 |
| 49 | Et$_3$Al + p-chlorobenzoic acid | 1.48 | 0.68 |
| 50 | Et$_3$Al + propionic acid | 1.36 | 0.58 |
| 51 | Et$_3$Al + p-Cl-benzoic acid | 1.49 | 0.73 |
| 52 | Et$_3$Al + benzoic acid | 1.45 | 0.52 |
| 53 | Et$_3$Al + propionic acid | 1.33 | 0.52 |
| 54 | Et$_3$Al +1 -octanol | 0.99 | 0.2 |
| 55 | Et$_3$Al + 3,4-dichloro-benzoic acid | 1.34 | 0.55 |
| 56 | Et$_3$Al + 2,4-dichloro-benzoic acid | 1.41 | 0.67 |
| 57 | Et$_3$Al + 2,6-dichloro-benzoic acid | 1.39 | 0.57 |

*Comparative Example

In Table 2, "Me" means methyl. Comparative Example 27 shows that the catalyst of U.S. Pat. No. 3,786,032 is less effective than most of the catalysts of this invention.

EXAMPLE 58 AND EXAMPLE 59

In Example 58 the polymerization was conducted the same way as in Example 1, but the reaction mixture was quenched after 3 hours.

Example 59 was the same as Example 58, but tetrahydrofuran (THF) was added to the catalyst system. Example 59 indicates that an external base does not influence significantly the activity of the catalyst. The following table gives the results.

| Example | Catalyst | Cocatalyst | THF (mmoles) | VCM (g) | PVC (g) |
|---|---|---|---|---|---|
| 58 | VO(O-iPr)$_3$ | Et$_2$AlOEt | 0 | 0.71 | 0.27 |
| 59 | VO(O-iPr)$_3$ | Et$_2$AlOEt | 3 | 0.79 | 0.28 |

EXAMPLES 60 TO 63

Polymerizations were conducted in same way as in Example 1, except that different solvents were used to show the applicability of solvents other than hexane. The polymerizations were conducted in a pressure tube first charged with a catalyst system made of 0.75 mmoles of vanadium triisopropoxide oxide, 1.5 mmoles of diethyl aluminum ethoxide in 1.5 ml of toluene, and 0.2 ml THF mixture.

| Example | Solvent | VCM (g) | PVC (g) |
|---|---|---|---|
| 60 | toluene | 2.74 | 1.76 |
| 61 | chlorobenzene | 1.4 | 1 |
| 62 | hexane | 1.1 | 0.83 |
| 63 | VCM | 10 | 9.45 |

In Example 63 the VCM itself was used as a solvent. Liquid VCM (10 g) was condensed into the pressure tube at −78° C. and the temperature was allowed to reach room temperature. Solids (PVC) formed as the reaction warmed to room temperature. After standing for 3 days pressure was released. The product was dissolved in THF and reprecipitated from methanol.

EXAMPLES 64 to 66

These Examples show the use of supported catalysts. The components were added to a slurry of a calcined fumed SiO$_2$ (Cabosil M5) support in pentane, then the pentane was evaporated and the solids were charged to the pressure tube (Examples 64 and 65, room temperature, 15 hours) or autoclave (Example 66, room temperature, 3 days). White PVC was obtained after the excess VCM had been vented.

| Example | Catalyst | Catalyst (mmoles) | Cocatalyst | Co-catalyst (mmoles) | SiO$_2$ (g) | VCM (g) | PVC (g) |
|---|---|---|---|---|---|---|---|
| 64 | VO(O-iPr)$_3$ | 0.069 | Et$_2$AlOEt | 0.126 | 0.15 | 20 | 3.2 |
| 65 | VO(O-iPr)$_3$ | 0.124 | Et$_2$AlOEt | 0.227 | 0.16 | 40 | 7.7 |
| 66 | VO(O-iPr)$_3$ | 0.41 | Et$_2$AlOEt | 0.77 | 0.5 | 112 | 38 |

EXAMPLES 67 to 72

These examples show the in-situ formation of vanadium mono, di, and tri alkoxy oxides from the reaction of vanadium trichloride oxide with one, two, or three equivalents of epoxide. Vanadium trichloride oxide (0.75 millimoles) was dissolved in 20 ml hexane and the epoxide was gradually added over a period of 5 minutes with stirring. After the epoxide addition, the mixture was stirred for 1 hour at room temperature and then 1.5 millimoles diethylaluminumethoxide was added. To this solution was added VCM. The mixture was kept at room temperature and stirred on a magnetic stirrer for 3 hours at ambient temperature. After excess VCM had been purged with nitrogen, the reaction mixture was quenched by pouring onto a solution of 5 ml concentrated HCl(aq) and 100 cc methanol. The product was filtered, washed several times with methanol, and air dried 24 hours to obtain PVC as a white powder. The conditions and results are given in the following table:

| Example | Epoxide | Epoxide (mmoles) | VCM (g) | PVC (g) |
|---|---|---|---|---|
| 67 | Propylene oxide | 0.75 | 0.93 | 0.375 |
| 68 | Propylene oxide | 2.25 | 0.85 | 0.245 |
| 69 | Cyclooctene oxide | 2.25 | 1.05 | 0.26 |
| 70 | Cyclohexene oxide | 0.75 | 1.35 | 0.25 |
| 71 | Cyclohexene oxide | 1.5 | 1.48 | 0.48 |
| 72 | Cyclohexene oxide | 2.25 | 1.44 | 0.44 |

EXAMPLES 73 to 78

These examples show the in-situ formation of vanadium trialkoxy oxide or triaryloxyoxide from the reaction of vanadium trichloride oxide with three equivalents of the lithium salt of an alcohol or phenol. The lithium salt of the alcohol or phenol (2.25 millimoles) was prepared by addition of alkyl lithium to a solution of the alcohol or phenol. After stirring the mixture one hour, vanadium trichloride oxide (0.75 millimoles) was added with stirring. The mixture was stirred for an additional hour at room temperature and 1.5 millimoles diethylaluminumethoxide was added and the solution was saturated with VCM. The mixture was kept at room temperature and stirred on a magnetic stirrer for 3 hours at ambient temperature. After the excess VCM had been purged with nitrogen, the reaction mixture was quenched by pouring onto a solution of 5 ml concentrated HCl(aq) and 100 cc methanol. The product was filtered, washed several times with methanol, and air dried 24 hours to obtain PVC as a white powder. The following table gives the conditions and results:

| Example | Lithium Salt | VCM (g) | Solvent | PVC (g) |
|---|---|---|---|---|
| 73 | LiOCH$_2$CH$_2$OEt | 1.85 | toluene | 0.371 |
| 74 | LiOCH$_2$CH$_2$NMe$_2$ | 2.5 | toluene | 0.325 |
| 75 | LiOPh | 0.89 | hexane | 0.28 |
| 76 | lithium - p-octyl-phenolate | 1.54 | hexane | 0.106 |
| 77 | lithium - pentachlorophenolate | 1.42 | hexane | 0.17 |
| 78 | lithium-2-chloro-4-trifluoromethylphenolate | 0.9 | hexane | 0.21 |

In the table, "Ph" means phenyl.

EXAMPLES 79 to 82

These examples show the in-situ formation of different vanadyl (V) catalysts with various ligands from the reaction of vanadium (V) trichloride oxide with the lithium salt given in the following table. As in Examples 73 to 78, the lithium salt was prepared and reacted with vanadium (V) trichloride oxide and the polymerization was conducted with 1.5 millimoles diethylaluminumethoxide. The following table gives the conditions and results:

| Example | Lithium Salt | Lithium Salt (mmoles) | VCM (g) | Solvent | PVC (g) |
|---|---|---|---|---|---|
| 79 | lithium-p-chlorobenzoate | 0.75 | 1.48 | hexane | 0.19 |
| 80 | lithium-p-chlorobenzoate | 1.5 | 1.51 | hexane | 0.18 |
| 81 | lithium acetylacetonate | 0.75 | 1.78 | hexane | 0.49 |
| 82 | lithium acetylacetonate | 1.5 | 1.22 | hexane | 0.11 |

EXAMPLE 83

To 1.5 millimole diethylaluminum ethoxide was added 20 ml hexane and 0.75 millimole vanadium tri-n-propoxide oxide. 1.45 gram VCM was added and the polymerization was run for three hours; 0.68 gram PVC was isolated as in Example 1.

EXAMPLE 84

To 1.5 millimole diethylaluminum ethoxide was added 20 ml hexane and 0.75 millimole vanadium triethoxide oxide. Then 1.61 gram VCM was added and the polymerization was run for three hours; 0.77 grams PVC was isolated as in Example 1.

EXAMPLE 85

This example shows the use of a supported vanadyl (V) catalyst in bulk polymerization in an autoclave. In a dry box under nitrogen atmosphere, to 5 grams silica (Sylapol 948 available from Grace Davison; surface area=280–355 m$^2$/g by BET) that had been calcined 16 hours at 600° C., was added 40 ml dry pentane. To this slurry was added 0.5 ml vanadium triisopropoxide oxide and the slurry stirred 16 hours. The slurry was allowed to stand without stirring, and the supernatant pentane removed by syringe. Fresh pentane (20 ml) was added and the mixture was stirred for 10 minutes. The slurry was allowed to stand without stirring, and the supernatant pentane removed by syringe. The silica supported catalyst was washed two additional times in this fashion and then residual pentane was removed by evaporation.

The silica supported catalyst (1.0 gram) was added to a 600 ml autoclave equipped with overhead stirrer. The autoclave was evacuated and then pressurized with VCM to 207 kPa (30 psig). The autoclave was cooled in an ice bath and VCM addition continued until 110 grams VCM had been added. The addition was stopped and the autoclave was cooled further until the pressure was 34.5 kPa (5 psig). Diethyl aluminum ethoxide (0.2 ml) was added through a port equipped with a valve and septum. The autoclave was warmed to room temperature (pressure=310 kPa (45 psi)) and stirred for 21 hours. Unreacted VCM was vented to a trap and 31 grams of white solid was removed from the reactor. According to $^{13}$C NMR spectroscopy, the content of syndiotacticdiads is 59.4%; this is higher than would be expected for a traditional free radical process at the same temperature (58.0%).

EXAMPLE 86

This example shows the use of supported catalyst and properties of the product. 1 gram of the silica supported catalyst used in Example 85 was added to a pressure tube equipped with magnetic stirrer. The tube was evacuated and then pressurized with VCM to 207 kPa (30 psig). The tube was cooled in an ice bath and VCM addition was continued until 20 grams VCM had been added. The addition was stopped and the pressure tube was cooled further until the pressure was 34.5 kPa (5 psig). Diethyl aluminum ethoxide (0.2 ml) was added through a septum. The tube was warmed to room temperature and stirring was continued for 17 minutes. At this time, the paste was too thick for the magnet to stir. After the excess vinyl chloride was vented to a trap, 1.46 grams of powdery white PVC was obtained. GPC analysis gave a Mw of 127,000 and a polydispersity of 3.7.

EXAMPLE 87

The polymerization of Example 86 was repeated with 0.2 gram of the silica supported catalyst used in Example 85. Diethyl aluminum ethoxide (0.2 ml of a 20% solution in hexane) was added through a septum. The tube was warmed to room temperature and stirring was continued for 3 hours. At this time, the paste was too thick for the magnet to stir. After the excess vinyl chloride was vented to a trap, 2.33 grams of powdery white PVC was obtained. GPC analysis gave a Mw of 221,000 and a polydispersity of 3.7.

Examples 86 and 87 show that the catalyst of the invention can be used to prepare very high molecular weight polymer, that the polymer molecular weight can be varied by the amount of catalyst present and that the polymer polydispersities are surprisingly high.

EXAMPLE 88

The polymerization of Example 87 was repeated, but the reaction was allowed to sit at room temperature even after stirring had ceased. After a total time of 18 hours, the excess vinyl chloride was vented to a trap and 5.15 grams of white PVC was obtained. GPC analysis gave a Mw of 225,000 and a polydispersity of 3.5. Thermogravimetric analysis was performed by heating the sample to 180° C. at 10° C. per minute under nitrogen. During this time a 1.4% weight loss was observed. This was presumably due mainly to volatile material and not to degradation. The sample was held for 6 hours at 180° C. and, during that entire time, the weight loss (presumably HCl evolution due to degradation) was 1.0%.

The very low weight loss during thermal treatment for 6 hours at 180° C. shows the excellent thermal stability of polymers of the invention.

We claim:

1. A method of polymerizing vinyl chloride monomer comprising contacting said monomer under polymerizing conditions with a supported catalyst which comprises (A) an insoluble particulate support; and
(B) a catalyst deposited on said support which comprises a mixture of a vanadyl (V) catalyst made by reacting vanadium trichloride oxide with a compound containing an oxirane ring, said catalyst having the formula

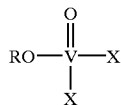

and about 0.5 to about 15 moles of an alkyl aluminum cocatalyst having the formula

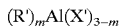

per mole of said catalyst, where R is a group containing 1 to 14 carbon atoms, each X is independently selected from halogen or OR, each R' is independently selected from alkyl from $C_1$ to $C_{10}$, each X' is independently selected from halogen,

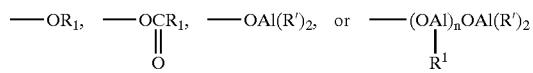

$R_1$ is alkyl from $C_1$ to $C_{10}$, haloalkyl from $C_1$ to $C_{10}$, alkoxyalkyl where each alkyl group is independently selected from $C_1$ to $C_{10}$, or aryl from $C_6$ to $C_{14}$, m is 1 or 2, and n is 1 to 100.

2. A method according to claim 1 wherein each X' is independently selected from halogen,

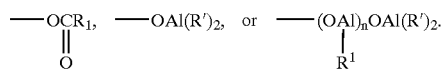

3. A method according to claim 1 wherein said alkyl aluminum cocatalyst is prepared by reacting trialkyl aluminum with water, an alcohol, or a carboxylic acid.

4. A method according to claim 1 wherein a comonomer is polymerized with said vinyl chloride.

5. A method according to claim 4 wherein said comonomer is selected from the group consisting of vinyl acetate, vinylidene chloride, and methylenenorbornene.

6. A method according to claim 1 wherein said polymerizing conditions are in bulk, gas phase, or solution.

7. A method according to claim 1 wherein said support is silica.

8. A method according to claim 1 wherein R is alkyl from $C_1$ to $C_4$.

9. A method according to claim 1 wherein each X is OR.

10. A method according to claim 1 wherein R' is alkyl from $C_1$ to $C_4$.

11. A method according to claim 10 wherein R' is ethyl.

12. A method according to claim 1 wherein each X' is halogen.

13. A method according to claim 12 wherein X' is chlorine.

14. A method according to claim 1 wherein X' is

15. A method according to claim 1 wherein said mixture is about 1.5 to about 4 moles of said alkyl aluminum cocatalyst per mole of said vanadyl (V) catalyst.

16. A method of polymerizing vinyl chloride monomer comprising contacting said monomer under polymerizing conditions with a supported catalyst which comprises
(A) an insoluble particulate support; and
(B) a catalyst deposited on said support which comprises a mixture of a vanadyl (V) catalyst having the formula

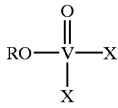

and about 0.5 to about 15 moles of an alkyl aluminum cocatalyst prepared by reacting trialkyl aluminum with water, an alcohol, or a carboxylic acid and having the formula $(R')_m Al(X')_{3-m}$ per mole of said catalyst, where R is a group containing 1 to 14 carbon atoms, each X is independently selected from halogen or OR, each R' is independently selected from alkyl from $C_1$ to $C_{10}$, each X' is independently selected from halogen,

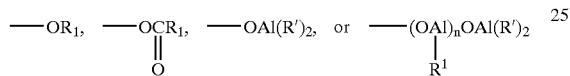

$R_1$ is alkyl from $C_1$ to $C_{10}$, haloalkyl from $C_1$ to $C_{10}$, alkoxyalkyl where each alkyl group is independently selected from $C_1$ to $C_{10}$, or aryl from $C_6$ to $C_{14}$, m is 1 or 2, and n is 1 to 100.

17. A method according to claim 16 wherein R is alkyl from $C_1$ to $C_4$.

18. A method according to claim 16 wherein each X is OR.

19. A method of polymerizing vinyl chloride monomer comprising contacting said monomer under polymerizing conditions with a supported catalyst which comprises
(A) an insoluble particulate support; and
(B) a catalyst deposited on said support which comprises a mixture of a vanadyl (V) catalyst having the formula

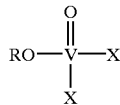

and about 0.5 to about 15 moles of an alkyl aluminum cocatalyst having the formula $(R')_m Al(X')_{3-m}$ per mole of said catalyst, where R is a group containing 1 to 14 carbon atoms, each X is independently selected from halogen or OR, each R' is independently selected from alkyl from $C_1$ to $C_{10}$, X' is

$R_1$ is alkyl from $C_1$ to $C_{10}$, haloalkyl from $C_1$ to $C_{10}$, alkoxyalkyl where each alkyl group is independently selected from $C_1$ to $C_{10}$, or aryl from $C_6$ to $C_{14}$, m is 1 or 2, and n is 1 to 100.

20. A method according to claim 19 wherein R is alkyl from $C_1$ to $C_4$ and each X is OR.

* * * * *